(12) United States Patent
Dispensa

(10) Patent No.: US 7,450,585 B2
(45) Date of Patent: Nov. 11, 2008

(54) METHOD AND SYSTEM IN AN IP NETWORK FOR USING A NETWORK ADDRESS TRANSLATION (NAT) WITH ANY TYPE OF APPLICATION

(75) Inventor: Jean Claude Dispensa, St Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 11/225,568

(22) Filed: Sep. 13, 2005

(65) Prior Publication Data
US 2006/0067342 A1 Mar. 30, 2006

(30) Foreign Application Priority Data
Sep. 27, 2004 (EP) .................................. 04300622

(51) Int. Cl.
H04L 12/28 (2006.01)
(52) U.S. Cl. ...................................... 370/392; 370/401
(58) Field of Classification Search ........................ None
See application file for complete search history.

(56) References Cited

U.S. PATENT DOCUMENTS

| 6,826,684 | B1 * | 11/2004 | Fink et al. ..................... 713/160 |
| 7,088,718 | B1 * | 8/2006 | Srivastava .................... 370/392 |
| 7,360,083 | B1 * | 4/2008 | Ragireddy et al. ........... 713/160 |
| 2003/0031173 | A1 * | 2/2003 | Park et al. .................... 370/389 |

* cited by examiner

Primary Examiner—Chau Nguyen
Assistant Examiner—Louis Bell
(74) Attorney, Agent, or Firm—Duke W. Yee; Libby Z. Handelsman; Barry L. Jones

(57) ABSTRACT

The present invention is based on a dual dynamic Network Address Translation (NAT): one Network Address Translation (NAT) is executed close to the client stations of customers (to NAT), and one Network Address Translation (NAT) is executed close to the application server (to un-NAT). The networks between the client stations and the application server, only see registerd addresses (public IP addresses), while the application only sees the real private IP address. The present invention is based on a method for "NATting" and "un-NATting" the IP addresses without having to pre configure the "NATting" devices (the devices executing the operations of translating the network addresses).

16 Claims, 4 Drawing Sheets

Routing between customer station and application server

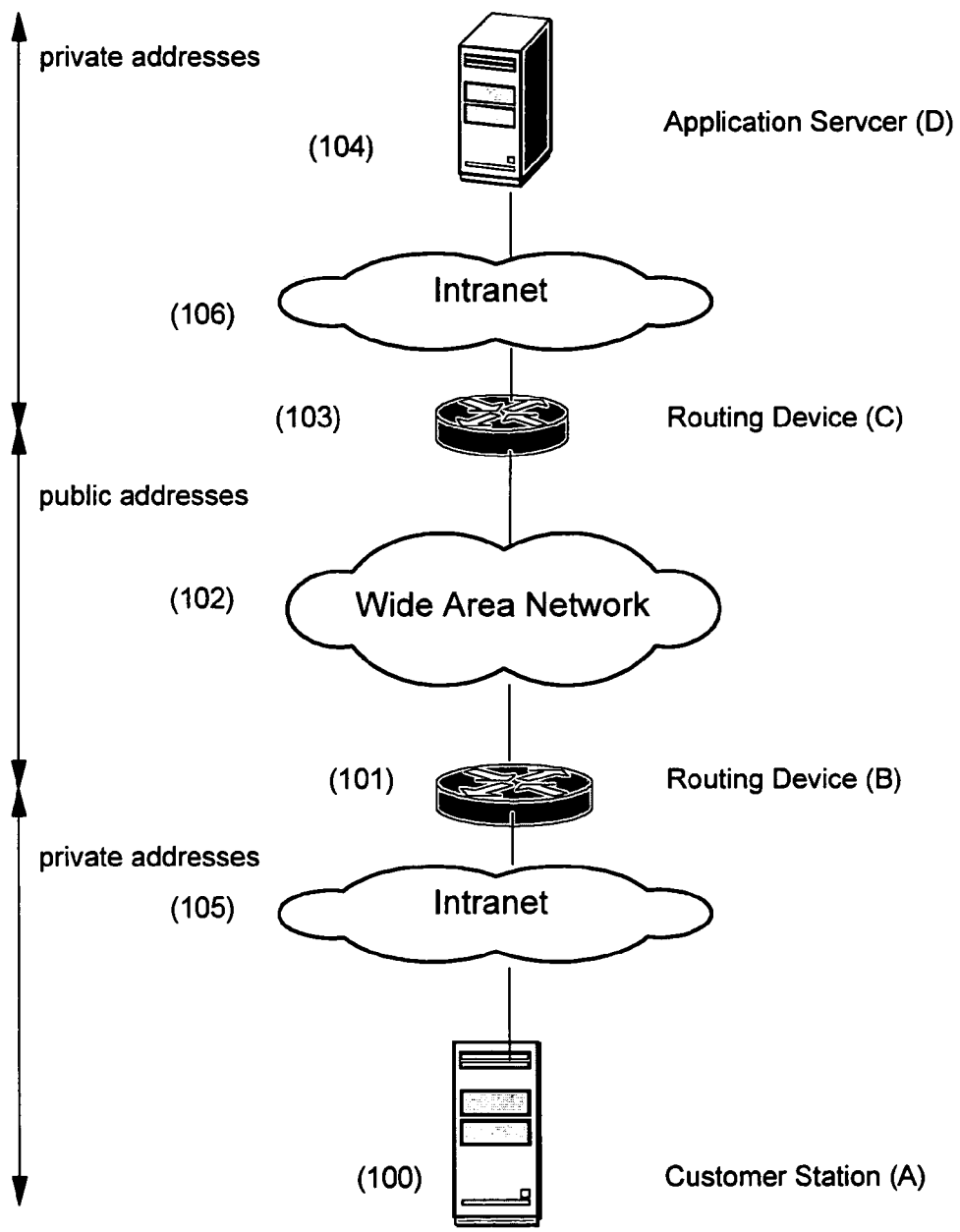
Fig 1 : Routing between customer station and application server

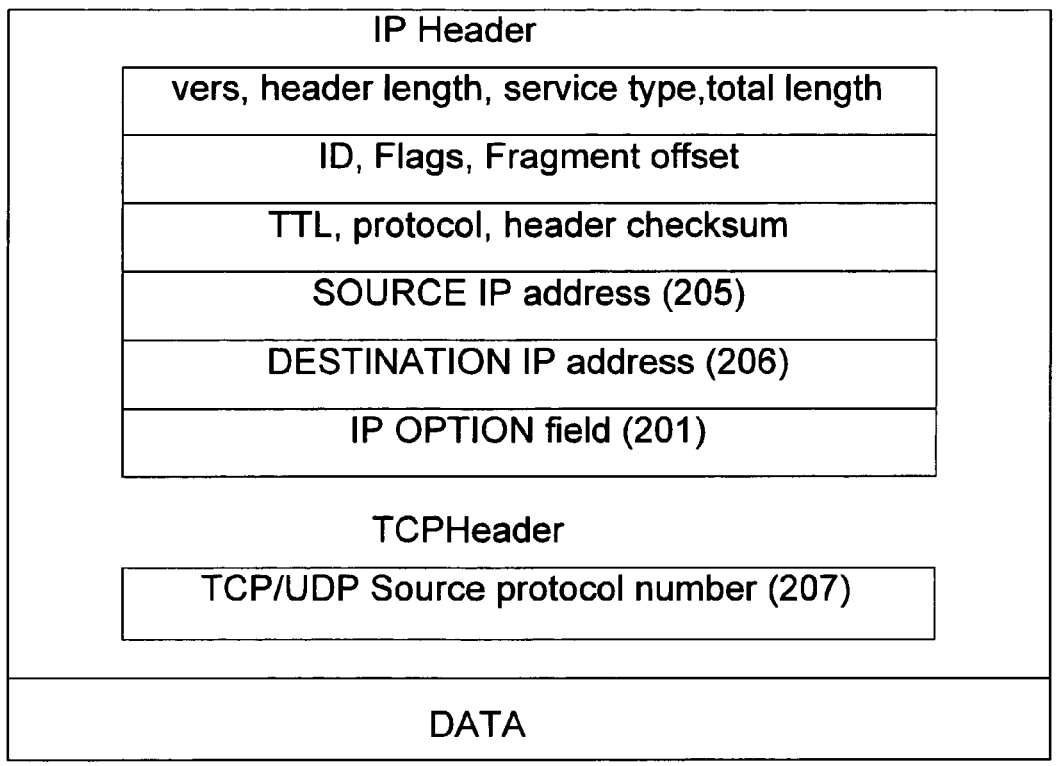
Fig 2 : IP header and IP option field

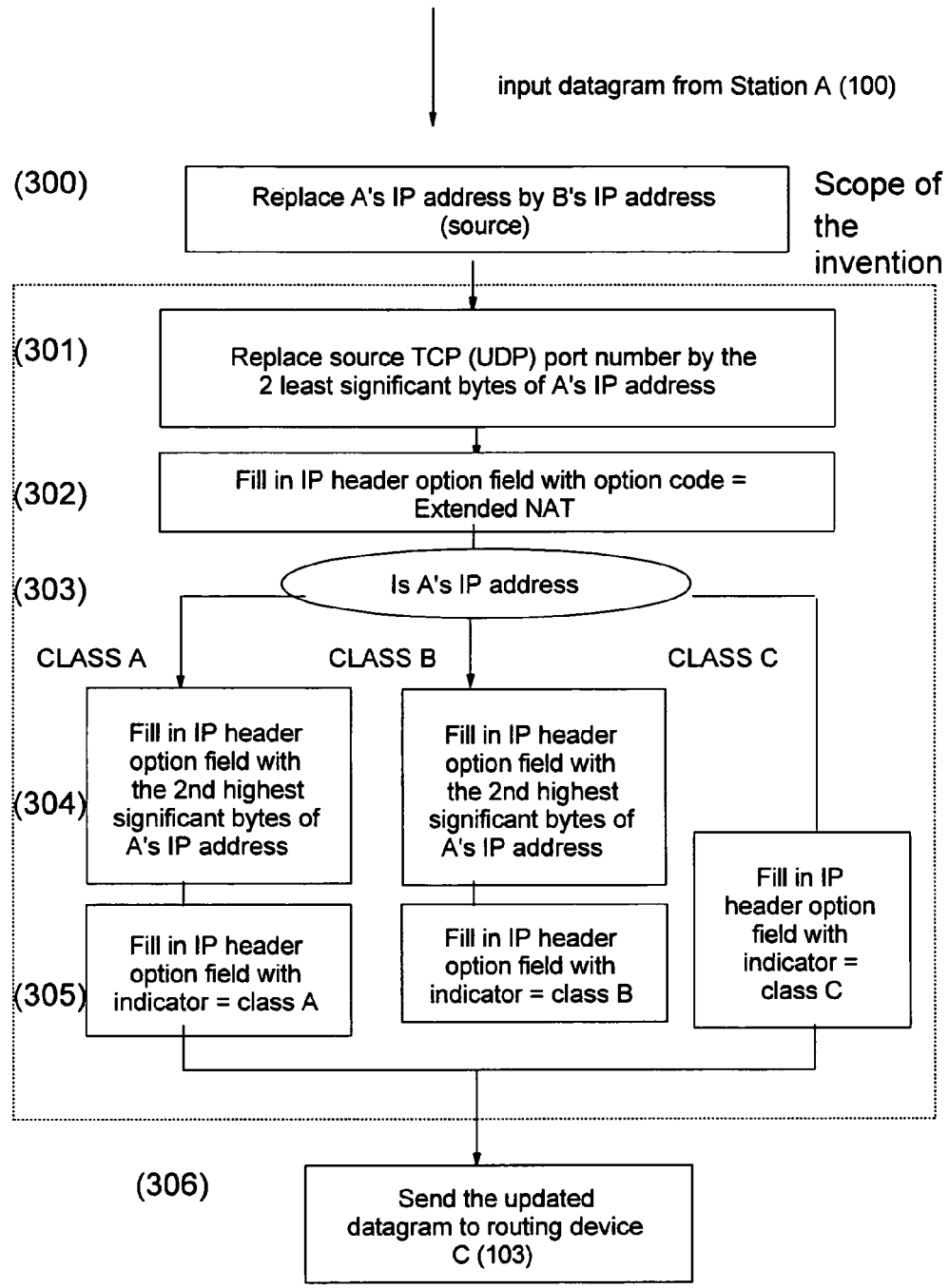
Fig 3 : Processing handled on Routing Device B

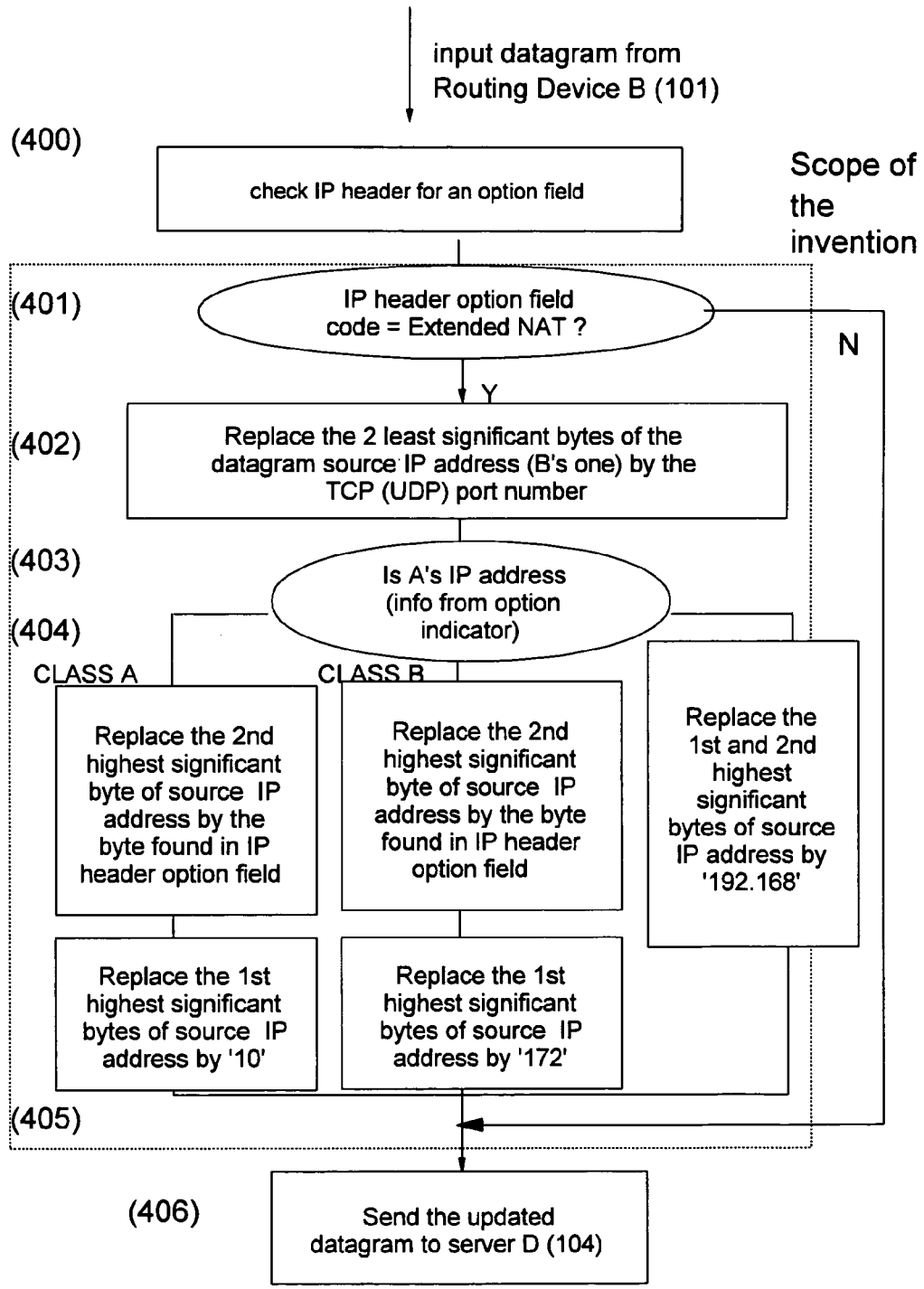
Fig 4 : Processing handled in Routing Device C

METHOD AND SYSTEM IN AN IP NETWORK FOR USING A NETWORK ADDRESS TRANSLATION (NAT) WITH ANY TYPE OF APPLICATION

TECHNICAL FIELD OF THE INVENTION

The present invention relates to computer networks, and more particularly to a method, system and computer program for translating addresses of Internet protocol (IP) datagrams in a transparent manner for sources and destinations located on different private IP networks.

BACKGROUND ART

Technical Field

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

- transmitting and receiving electronic mail ("SMTP" or "Simple Mail Transfer Protocol"),
- logging into remote computers ("Telnet"), and
- transferring files and programs from one computer to another ("FTP" or "File Transfer Protocol"),
- transmitting and receiving "HTTP" ("HyperText Transfer Protocol") pages.

TCP/IP

The TCP/IP protocol suite is named for two of the most important protocols:

- a Transmission Control Protocol (TCP), and
- an Internet Protocol (IP).

Another name for it is the Internet Protocol Suite. The more common term TCP/IP is used to refer to the entire protocol suite. The first design goal of TCP/IP is to build an interconnection of networks that provide universal communication services: an internetwork, or internet. Each physical network has its own technology dependent communication interface, in the form of a programming interface that provides basic communication functions running between the physical network and the user applications. The architecture of the physical networks is hidden from the user. The second goal of TCP/IP is to interconnect different physical networks to form what appears to the user to be one large network.

TCP is a transport layer protocol providing end to end data transfer. It is responsible for providing a reliable exchange of information between 2 computer systems. Multiple applications can be supported simultaneously over one TCP connection between two computer systems.

IP is an internetwork layer protocol hiding the physical network architecture bellow it. Part of the communicating messages between computers is a routing function that ensures that messages will be correctly directed within the network to be delivered to their destination. IP provides this routing function. An IP message is called an IP Datagram.

Application Level protocols are used on top of TCP/IP to transfer user and application data from one origin computer system to one destination computer system. Such Application Level protocols are for instance File Transfer Protocol (FTP), Telnet, Gopher, Hyper Text Transfer Protocol (HTTP).

Uniform Resource Locators

A resource of the Internet is unambiguously identified by a Uniform Resource Locator (URL), which is a pointer to a particular resource at a particular location. An URL specifies the protocol used to access a server (e.g. HTTP, FTP, ...), the name of the server, and the location of a file on that server.

Clients and Servers

TCP/IP is a peer-to-peer, connection oriented protocol. There are no master/slave relations. The applications, however use a client/server model for communications. A server is an application that offers a service to internet users; a client is a requester of service. An application consists of both a server and a client part which can run on the same or on different computer systems.

Users usually invoke the client part of the application, which builds a request for a particular service and sends it to the server part of the application using TCP/IP as transport vehicle.

The server is a program that receives a request, performs the required service and sends back the result in a reply. A server can usually deal with multiple requests (multiple clients) at the same time.

IP Router

A "Router" is a computer that interconnects two networks and forwards messages from one network to the other. Routers are able to select the best transmission path between networks. The basic routing function is implemented in the IP layer of the TCP/IP protocol stack, so any host (or computer) or workstation running TCP/IP over more than one interface could, in theory, forward messages between networks. Because IP implements the basic routing functions, the term "IP Router" is often used. However, dedicated network hardware devices called "Routers" can provide more sophisticated routing functions than the minimum functions implemented in IP.

Intranet

Some companies use the same mechanism as the Internet to communicate inside their own corporation. In this case, this mechanism is called an "Intranet". These companies use the same networking/transport protocols and locally based computers to provide access to vast amount of corporate information in a cohesive fashion. As this data may be private to the corporation, and because the members of the company still need to have access to public Internet information, to avoid that people not belonging to the company can access to this private Intranet coming from the public Internet, they protect the access to their network by using a special equipment called a Firewall.

IP Addressing

IP addresses are used by the IP protocol to uniquely identify a host on the Internet. Strictly speaking, an IP address identifies an interface that is capable of sending and receiving IP datagrams. Each IP datagram (the basic data datagrams that are exchanged between hosts) comprises a source IP address and a destination IP address. IP addresses are represented by a 32-bit unsigned binary value which is usually expressed in a dotted decimal format. For example, 9.167.5.8 is a valid Internet address. An IP address is divided between a network and a host part, the first bits of the IP address specifying how the rest of the address is divided. The mapping between the IP address and an easier-to-read symbolic name, for example myhost.ibm.com, is done by the "Domain Name System" (DNS).

Internet Assigned Numbers Authority (IANA)

In order to be assured of any to any communication between servers in the Internet, all IP addresses have to be officially assigned by the Internet Assigned Numbers Authority (IANA). Many organizations use locally assigned IP addresses, basically comprised within reserved ranges of addresses for private Internets to avoid colliding with officially assigned IP addresses. These IP addresses cannot be routed on the Internet.

IP Subnets

Due to the explosive growth of the Internet, the principle of assigned IP addresses became too inflexible to allow easy changes to local network configurations. These changes might occur when:

A new type of physical network is installed at a location.
Growth of the number of hosts requires splitting the local network into two or more separate networks.
Growing distances require splitting a network into smaller networks with gateways between them.

To avoid requesting additional IP network addresses in case of changes, the concept of subnets has been introduced. The assignment of subnet can be done locally, as the whole network still appears to be one IP network to the outside world. The host number part of the IP address is subdivided into a network number and a host number. This second network is called "subnetwork" or "subnet". The subnetting is implemented in a way that is transparent to remote networks.

Private IP Adresses

An approach for the conservation of the IP address space, is the use of private IP addresses. This approach relaxes the rule that IP addresses are globally unique by reserving part of the address space for networks that are used exclusively within a single organisation and that do not require IP connectivity to the Internet. Any organisation can use addresses in particular ranges without reference to any other organisation. However, because theses addresses are not globally unique, they cannot be referenced by hosts in another organisation and they are not defined to any other external routers. Routers in network not using private addresses are expecting to discard all routing information regarding these addresses. Routers in an organisation using private addresses are expected to limit all references to private addresses to internal links; they should neither advertise routes to private addresses to external routers nor forward IP datagrams comprising private addresses to external routers. Hosts having only a private IP address do not have IP layer connectivity to the Internet. All connectivity to external Internet hosts must be provided with "Application Level Gateways", often referred to as a "Proxy".

Usage and definition of private IP addresses are described in the IETF Request For Comment database (RFC1918). This RFC defines 3 classes (or ranges) of private IP addresses:

Class A range: all addresses within network 10.0.0.0/8, i.e. all addresses between 10.0.0.0 and 10.255.255.255.
Class B range: all addresses within 16 class B network 172.16.0.0/16 to 172.31.0.0/16, i.e. all addresses between 172.16.0.0 and 172.31.255.255.
Class C range: all addresses within 256 class C network 192.168.0.0/24 to 192.168.255.0/24, i.e. all addresses between 192.168.0.0 and 192.168.255.255.

Network Address Translation

Network Address Translation (NAT) is based on the fact that only a small part of the hosts in a private network are communicating outside that network. If each host is assigned an IP address from the public IP address pool only when they need to communicate, then only a small number of public IP addresses are required. NAT is a solution for networks that have private IP address ranges and want to communicate with hosts on the Internet. In fact, most of the time, this can also be achieved by implementing a Firewall. Hence, clients that communicate with the Internet by using a Proxy or Socks server do not expose their addresses to the Internet, so their addresses do not have to be translated anyway. However, for any reason, when Proxy and Socks are not available or do not meet specific requirements, NAT can be used to manage the traffic between the internal and external network without advertising the internal host addresses.

Proxy Server

A Proxy server, also called Application Level Gateway, is an application-specific relay server that runs on the host that connects a secure and non-secure network. The purpose of a Proxy server is to control exchange of data between the two networks at an application level instead of an IP level. By using a Proxy server, it is possible to disable IP routing between the secure and the non-secure network for the application protocol the Proxy server is able to handle, but still be able to exchange data between the networks by relaying it in the Proxy server.

In order for any client to be able to access the Proxy server, the client software must be specifically modified. In other words, the client and server software must support the proxy connection.

Compared with IP filtering, Proxies provide much more comprehensive logging based on the application data of the connections. For example, an HTTP Proxy can log the URLs (Uniform Resource Locators) visited by users. Another feature of Proxies is that they can use strong user authentication.

More explanations about the technical field presented in the above sections can be found in the following publications incorporated herewith by reference: "TCP/IP Tutorial and Technical Overview" by Martin W. Murhammer, Orcun Atakan, Stefan Bretz, Larry R. Pugh, Kazunari Suzuki, David H. Wood, International Technical Support Organization, October 1998, GG24-3376-05.

Problem of Routing Private IP Addresses

In the world of networking (LAN and WAN), the routing of private IP addresses (as defined in RFC1918) can be a problem. Most customers are using private IP addresses in their intranet. However, since customers have an increasing need to be connected to other customers on the Internet or to centralized management systems, the routing of private IP addresses in a shared network may become a real problem. Different solutions based on the use of Network Address Translation (NAT) or Proxy, exist today to translate private IP addresses into registered (public) IP addresses.

However, some applications cannot work with translated IP addresses. These applications are using the original (private) IP address in the payload and this private IP address cannot be translated by a NAT device. This is for instance the case for some Tivoli management products ("Tivoli" is a trademark of IBM Corporation) and some other client-server applications.

SUMMARY OF THE INVENTION

The present invention is directed to a method and system as defined in independent claims, for translating addresses of Internet protocol (IP) datagrams in a transparent manner for sources and destinations located on different private IP networks.

A first object of the present invention to use in a first router connected on one hand to a first private Internet Protocol (IP) network and on another hand to a public IP network, is to translate in a datagram a source private IP address into a public IP address so that said private IP address can be translated back into the same private IP address by a second router connected to a second private network. The method in said first router, comprises the steps of:

receiving an IP datagram from a source within a first private IP network, comprising a header including:
    a source private IP address;
    an IP option field;
    a source TCP/UDP port number;
  replacing in the IP datagram header, the source private IP address by the public IP address of the first router;
  replacing in the IP datagram header the source TCP/UDP port number by the two least significant bytes of the source private IP address;
  copying in the IP option field, information related to the first and the second highest significant bytes of the source private IP address so that said first and the second highest significant bytes can be deduced from said information,
  forwarding the IP datagram on the public IP network.

A second object of the invention to use in a second router connected on one hand to a public Internet Protocol (IP) network and on another hand to a second private IP network, is to translate in a datagram a source public IP address into a private IP address, said source private IP address having been previously translated into said source public IP address by a first router connected to a first private network. The method in said second router, comprises the steps of:

receiving from the public IP network, an IP datagram intended to be forwarded to a destination within the second private IP network, said datagram comprising a header including:
    a source public IP address;
    an IP option field;
    a source TCP/UDP port number;
  if the source public IP address has been previously translated by a first router:
    replacing in the IP datagram header, the two least significant bytes of the source public IP address into the source TCP (UDP) port number;
    replacing in the IP datagram header, the first and the second highest significant bytes of the source public IP address by the first and second bytes of a source IP private address deduced from information retrieved from the IP header option field;
  forwarding the IP datagram to its destination within the second private IP network.

Further embodiments of the invention are provided in the appended dependent claims.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 shows a source station and a destination server interconnected by means of routers and networks according to the present invention.

FIG. 2 is a view of an IP datagram with a description of the IP header and the IP option field as used in the present invention FIG. 3 is a flow chart showing the different steps performed by the router 'B' close to the source station 'A' when receiving IP datagrams from source 'A' according to the present invention.

FIG. 4 is a flow chart showing the different steps performed by the router 'C' close to the destination server 'D' when receiving IP datagrams from router 'B' according to the present invention.

PREFERRED EMBODIMENT OF THE INVENTION

The following description is presented to enable one or ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Introduction

General Principles of the Invention

The present invention is based on a dual dynamic Network Address Translation (NAT):
  one Network Address Translation (NAT) is executed close to the client stations of customers (to NAT), and
  one Network Address Translation (NAT) is executed close to the application server (to un-NAT).

The networks between the client stations and the application server, only see registered addresses (public IP addresses), while the application only sees the real private IP address. The present invention is based on a method for "NATting" and "un-NATting" the IP addresses without having to pre configure the "NATting" devices (the devices executing the operations of translating the network addresses).

An alternative is to use the so called "Generic Routing Encapsulation" (GRE) developed by CISCO Systems, Inc. The Generic Routing Encapsulation (GRE) is a tunneling protocol used to encapsulate the datagrams into a tunnel. However, this technology is limited to a single router vendor (CISCO Systems, Inc.) and does not work on other routing devices (firewalls, servers, . . . ). Other encapsulation or tunneling methods have the drawback to add unnecessary headers and to increase the need of bandwidth and the transmission the cost.

Network Address Translation

The only solution to communicate between a private network based on private IP addresses and a public network (as the Internet) using an application protocol for which there is no application gateway, is to establish a connectivity at the IP level between hosts in the private network and host on the Internet. Since the routers in the Internet don't know how to route IP datagrams back to a private IP address, it is not possible to send IP datagrams with private IP addresses as source IP addresses through a router into the Internet.

The NAT transparently translates the private IP addresses of a private network to public IP addresses so that IP datagrams can be routed on the Internet. The NAT dynamically translates the private IP address of outgoing datagrams to a public IP address. For incoming datagrams, the NAT translates the public IP address to a private IP address. For the point of two hosts that exchange IP datagrams between each other, one host being connected to a secure network (the private network) and the other one being connected to a non secure network (the Internet), the Network Address Translator (NAT) looks like a standard IP router that forwards IP datagrams between two networks interfaces.

Since the TCP/IP stack that implements NAT looks like a normal IP router, there is a need to create an appropriate IP network design for connecting two or more IP networks or subnets through a router. The NAT IP addresses need to come from separate networks or subnets, and the addresses need to be unambiguous with respect to other networks or subnets in the non-secure network. If the non-secure network is the Internet, the NAT addresses need to come from a public network or subnet, in other words, the NAT addresses need to be assigned by IANA (Internet Assigned Numbers Authority).

The non-secure addresses (official addresses) should be reserved in a pool, in order to use them when needed. If connections are established from the secure network, NAT can just pick the next free public address in the NAT pool and assign that to the requesting secure host. NAT keeps track of which secure IP addresses are mapped to which non-secure IP addresses at any given point in time, so it will be able to map a response it receives from the non-secure network into the corresponding secure IP address.

IP Option Field for Extended NAT

FIG. 1 shows a network comprising:
- a source station 'A' (100),
- a first private IP network (105),
- a routing device 'B' (101),
- a Wide Area Network (WAN) (102),
- a routing device 'C' (103),
- a second private IP network (106), and
- a destination server 'D' (104).

In the example shown in FIG. 1, the customer station 'A' has a private address in a RFC1918 range 10.0.0.0 class A or 172.16.0.0-172.31.255.255 or 192.168.0.0-192168.255.255. This customer station is connected to a routing device 'B' though a first private network (Intranet network). This routing device 'B' is itself connected through a public network (Wide Area Network (WAN) backbone or Internet network) (102) to a routing device 'C'. This routing device 'C' is itself connected to an application server 'D' through a second private network (Intranet network) (106).

As shown in FIG. 2, each datagram (200) sent by the customer station 'A' to the application server 'D' comprises the following fields:
in the IP header:
- a private source IP address (205) of the customer station 'A',
- a destination IP address (206) of the application server 'D',
- an IP option field (201),
in the TCP header:
- a TCP (or UDP) source port number (207) to identify the target application.

The invention is based on the following features:
Between the routing devices 'B' and 'C', the IP option field (201) in the IP header is defined to carry:
- a subset (two bytes (203 & 204) in the general case and optionally one byte (204) when a class indicator is used) (204) of the source private IP address (205), and
- optionally, a class indicator (203) giving the source private IP address range (class A or B or C) of customer station 'A'.
the source TCP (UDP) port number (2 bytes) of the datagram (207) is used to carry the least significant bytes of the source IP private address (205).

General Embodiment

Routing Device 'B'

The different steps performed by the router 'B' close to the source station 'A' (customer station) when receiving IP datagrams from source 'A' according to the present invention are described here below. For each datagram sent by the customer station 'A' to the application server 'D', the routing device 'B':

Translates the source private IP address (205) of the customer station 'A' into its own registered (public) IP address (the IP address of the routing device 'B').

Translates the source TCP (UDP) port number (207) by the two least significant bytes of the private IP address of the customer station 'A'.

Fills the IP option field (201) with an option number (202) indicating 'Extended NAT'.

Fills the IP option field (203 & 204) with the the two highest significant bytes of the private IP address of the customer station 'A'.

Routing Device 'C'

The different steps performed by the router 'C' close to the destination server 'D' when receiving IP datagrams from router 'B' according to the present invention, are described here below. For each datagram sent by the customer station 'A' to the application server 'D', the routing device 'C' replaces the NATted source IP address by the original source IP address. The routing device 'C' rebuilds this address based on the information received in the source TCP (UDP) port and from the IP option field. The routing device 'C':

Checks in the IP header of the datagram (200) in the IP option field (201), the option number (202) 'Extended NAT'.

If the option number (202) is not 'Extended NAT', the routing device 'C' goes on with the standard process.

If the option number is 'Extended NAT', the routing device 'C', translates the 2 least significant bytes of the source public IP address into the source TCP (UDP) port number (207).

replaces the first and the second highest significant bytes of the source public IP address (205) by the two bytes (203 & 204) found in the IP header option field (201).

Application Server 'D'

The application server 'D' receives the datagrams with the source private IP address of the customer station 'A' The NAT processes handled by routers 'B' and 'C' are totally transparent for server D.

Way Back

The same process applies on the way back. The routing device 'C' NATs the destination private address with the same mechanism as described above and the routing device 'B' unNATs it into the private address of the customer station 'A'.

IP Option Field

In a preferred embodiment, the IP option field (4 bytes) (201), comprises the following fields:
- the first byte (202) comprises
  - a 'copy' flag (this 'copy' flag is set to 1 in our case to have the options copied in all possible fragmented frames),
  - the class flags (set to 0), and
  - a new option code (31 for example).
- the second byte (203) comprises the 1st highest byte of the source private IP address (203).
- the third byte (204) comprises the 2nd highest byte of the source private IP address (204).
- the fourth byte is reserved.

Particular Embodiment

Routing Device 'B'

FIG. 3 is a flow chart showing the different steps performed by the router 'B' close to the source station 'A' (customer station) when receiving IP datagrams from source 'A' according to the present invention. For each datagram sent by the customer station 'A' to the application server 'D', the routing device 'B':

- Translates (300) the source private IP address (205) of the customer station 'A' into its own registered (public) IP address (the IP address of the routing device 'B').
- Translates (301) the source TCP (UDP) port number (207) by the 2 least significant bytes of the private IP address of the customer station 'A'.
- Fills (302) the IP option field (201) with an option number (202) indicating 'Extended NAT'.
- Checks (303) the class of the private IP address of the customer station 'A':
  - For the range 192.168.0.0 to 192.168.255.255, there is no need to carry the high bytes because these bytes are always the same (192.168). So, the routing device 'B' fills the class indicator field (203) of the IP option field (201) with 'class C' (305).
  - For the range 172.16.00 to 172.31.255.255, only one byte carries the value from 16 to 31 because the address always starts with 172. So, the routing device 'B' fills the IP option field (204) with the second highest significant bytes of the address of the customer station 'A' (304) and the class indicator field (203) of the IP option field (201) with 'class B' (305).
  - For the 10. 'class A' range, one byte carries the second byte (after the 10.) since the source IP address always starts with 10. So, the routing device 'B' fills the IP option field (204) with the the second highest significant bytes of the address of the customer station 'A' (304) and the class indicator field (203) of the IP option field (201) with 'class A' (305).

Routing Device 'C'

FIG. 4 is a flow chart showing the different steps performed by the router 'C' close to the destination server 'D' when receiving IP datagrams from router 'B' according to the present invention. For each datagram sent by the customer station 'A' to the application server 'D', the routing device 'C' replaces the NATted source IP address by the original source IP address. The routing device 'C' rebuilds this address based on the information received in the source TCP (UDP) port and from the IP option field. The routing device 'C':

- Checks (401) in the IP header of the datagram (200) in the IP option field (201), the option number (202) 'Extended NAT'.

If the option number (202) is not 'Extended NAT', the routing device 'C' goes on with the standard process.

If the option number is 'Extended NAT', the routing device 'C', translates (402) the 2 least significant bytes of the source public IP address into the source TCP (UDP) port number (207).

Checks (403) the class of the private IP address of customer station 'A' in the class indicator field (203):
- For the range 192.168.0.0 to 192.168.255.255, replaces the 1st and 2nd highest significant bytes of the source public IP address (205) by '192.168'.(404).
- For the range 172.16.00 to 172.31.255.255, replaces the 2nd highest significant byte of the source public IP address by '172' (404) and replaces the 1st highest significant byte of the source public IP address (205) by the byte found in the IP header option field (405).
- For the 10. 'class A' range, replaces the 2nd highest significant byte of the source public IP address by '10' (404) and replaces the 1st highest significant byte of the source public IP address (205) by the byte (204) found in the IP header option field (201) (405).

Application Server 'D'

The application server 'D' receives the datagrams with the source IP address of the customer station 'A' The NAT processes handled by routers 'B' and 'C' are totally transparent for server D.

Way Back

The same process applies on the way back. The routing device 'C' NATs the destination private address with the same mechanism as described above and the routing device 'B' unNATs it into the private address of the customer station 'A'.

IP Option Field

In a preferred embodiment, the IP option field (4 bytes) (201), comprises the following fields:
- the first byte (202) comprises
  - a 'copy' flag (this 'copy' flag is set to 1 in our case to have the options copied in all possible fragmented frames),
  - the class flags (set to 0), and
  - a new option code (31 for example).
- the second byte (203) comprises a 'class indicator':
  - '0' means class 'C' (address is in the range 192),
  - '1' means class 'B' (address is in the range 172), and
  - '2' means 'class C' (address is in the range 10).
- the third byte (204) comprises the 2nd highest byte of the private address (204).
- the fourth byte is reserved.

EXAMPLE

So for example, if 'A1' and 'A2' are 2 customer stations with addresses 10.1.1.1 and 10.1.1.2 sending a frame to the application server 'D', all the frame NATted by the router device 'B' will have:
- the IP address of the router device 'B' as source
- '11' as source TCP protocol number for 'A1' and '12' for 'A2'
- the IP option field equal to x'9F-02-01-00', i.e. 'copy' bit, option number 31, private address in the 10 range and 2n byte of IP address='01'.

The routing device 'C' is then able to rebuild the 10.1.1.1 and 10.1.1.2 source IP addresses before forwarding the frame to the application server 'D' and without any pre configuration.

Advantage

The advantage of this particular embodiment is to save some bits in the IP option field.

Instead of writing the first highest significant byte in the IP option field, only an indication of the address range of the source private IP address (class indicator 203) is stored in the IP field (201).

While the invention has been particularly shown and described with reference to a preferred embodiment, it will be understood that various changes in form and detail may be made therein without departing from the spirit, and scope of the invention.

What I claim is:

1. A method to use in a first router connected on one hand to a first private Internet Protocol (IP) network and on another hand to a public IP network, for translating in a datagram a source private IP address into a public IP address so that said private IP address can be translated back into the same private IP address by a second router connected to a second private network, said method comprising the steps of:
    receiving an IP datagram from a source within a first private IP network, comprising a header including:
        a source private IP address;
        an IP option field;
        a source TCP/UDP port number;
    replacing in the IP datagram header, the source private IP address by the public IP address of the first router;
    replacing in the IP datagram header the source TCP/UDP port number by the two least significant bytes of the source private IP address;
    copying in the IP option field, information related to the first and the second highest significant bytes of the source private IP address so that said first and the second highest significant bytes can be deduced from said information,
    forwarding the IP datagram on the public IP network.

2. The method according to claim 1 comprising the further steps of:
    indicating in the IP option field that the source IP address has been translated.

3. The method according to claim 1 wherein the step of copying in the IP option field, information related to the first and the second highest significant bytes of the source private IP address, comprises the further step of:
    identifying a class associated the source private IP address;
        a class corresponding to a predefined range of IP addresses;
    including in the IP option field, means for identifying said class.

4. The method according to claim 1 wherein the step of copying in the IP option field; information related to the first and the second highest significant bytes of the source private IP address, comprises the further step of:
    if the identified class corresponds to the range 192.168.0.0 to 192.168.255.255,
        including in the IP option field, means for identifying said class.

5. The method according to claim 1 wherein the step of copying in the IP option field, information related to the first and the second highest significant bytes of the source private IP address, comprises the further step of:
    if the identified class corresponds to the range 172.16.00 to 172.31.255.255,
        including in the IP option field, means for identifying said class,
        copying in the IP option field the second highest significant byte of the source private IP address.

6. The method according to claim 1 wherein the step of copying in the IP option field, information related to the first and the second highest significant bytes of the source private IP address, comprises the further step of:
    if the address starts with '10':
        including in the IP option field, means for identifying said class,
        copying in the IP option field the second highest significant byte of the source private IP address.

7. A router comprising means adapted for carrying out the method according to claim 1.

8. A computer program comprising instructions for carrying out the method according to claim 1 when executed on a computer system.

9. A method to use in a second router connected on one hand to a public Internet Protocol (IP) network and on another hand to a second private IP network, for translating in a datagram a source public IP address into a private IP address, said source private IP address having been previously translated into said source public IP address by a first router connected to a first private network, said method comprising the steps of:
    receiving from the public IP network, an IP datagram intended to be forwarded to a destination within the second private IP network, said datagram comprising a header including:
        a source public IP address;
        an IP option field;
        a source TCP/UDP port number;
    if the source public IP address has been previously translated by a first router:
        replacing in the IP datagram header, the two least significant bytes of the source public IP address into the source TCP (UDP) port number;
        replacing in the IP datagram header, the first and the second highest significant bytes of the source public IP address by the first and second bytes of a source IP private address deduced from information retrieved from the IP header option field;
    forwarding the IP datagram to its destination within the second private IP network.

10. The method according to claim 9 comprising the step of:
    determining in the IP field whether or not the source public IP address has been previously translated.

11. The method according to claim 9 wherein the step of replacing in the IP datagram header, the first and the second highest significant bytes of the source public IP address, comprises the further steps of:
    identifying in the IP option field, a class associated with the source private IP address, a class corresponding to a predefined range of addresses;
    replacing the first highest significant byte by the range of addresses corresponding to identified class.

12. The method according to claim 9 wherein the step of replacing in the IP datagram header, the first and the second highest significant bytes of the source public IP address, comprises the step of:
    if the identified class corresponds to the range 192.168.0.0 to 192.168.255.255,
        replacing the first and the second highest significant byte of the source public IP address in the datagram header by '192.168'.

13. The method according to claim 9 wherein the step of replacing in the IP datagram header, the first and the second highest significant bytes of the source public IP address, comprises the steps of:

if the identified class corresponds to the range 172.16.00 to 172.31.255.255,
    replacing the first highest significant byte of the source public IP address in the datagram header by '172',
    retrieving from the IP option field the second highest significant byte of the source private IP address,
    replacing the second highest significant byte of the source public private IP address by the retrieved byte.

14. The method according to claim 9 wherein the step of replacing in the IP datagram header, the first and the second highest significant bytes of the source public IP address, comprises the steps of:

if the identified class corresponds to the range '10.', instead of replacing the first highest significant byte by the byte found in the IP header option field,
    replacing the first highest significant byte of the source public IP address in the datagram header by '10',
    retrieving from the IP option field the second highest significant byte of the source private IP address,
    replacing the second highest significant byte of the source public private IP address by the retrieved byte.

15. A router comprising means adapted for carrying out the method according to claim 9.

16. A computer program comprising instructions for carrying out the method according to claim 9 when executed on a computer system.

* * * * *